United States Patent
Neubauer et al.

(10) Patent No.: US 6,684,449 B2
(45) Date of Patent: Feb. 3, 2004

(54) WIPER BLADE WITH SPRING BIAS

(75) Inventors: Achim Neubauer, Sinzheim-Vormberg (DE); Martin-Peter Bolz, Buehl (DE); Jochen Moench, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 10/049,713

(22) PCT Filed: Mar. 22, 2001

(86) PCT No.: PCT/DE01/01117
§ 371 (c)(1),
(2), (4) Date: Jan. 18, 2002

(87) PCT Pub. No.: WO01/89894
PCT Pub. Date: Nov. 29, 2001

(65) Prior Publication Data
US 2002/0104183 A1 Aug. 8, 2002

(30) Foreign Application Priority Data
May 25, 2000 (DE) .......................... 100 25 722

(51) Int. Cl.⁷ ................ B60S 1/40; B60S 1/38
(52) U.S. Cl. .................. 15/250.32; 15/250.47
(58) Field of Search ............... 15/250.32, 250.33, 15/250.46, 250.47, 250.351, 250.44

(56) References Cited

U.S. PATENT DOCUMENTS

| 2,888,702 A | 6/1959 | Sussex | ............ | 15/250.47 |
| 3,399,419 A * | 9/1968 | Wise | ............ | 15/250.47 |
| 4,007,511 A * | 2/1977 | Deibel | ............ | 15/250.47 |
| 4,095,308 A * | 6/1978 | Blaiklock et al. | ........ | 15/250.47 |
| 4,187,576 A | 2/1980 | Deibel | ............ | 15/250.47 |

FOREIGN PATENT DOCUMENTS

| FR | 2 216 152 A | 8/1974 |
| FR | 2 437 959 A | 4/1980 |

* cited by examiner

Primary Examiner—Gary K. Graham
(74) Attorney, Agent, or Firm—Michael J. Striker

(57) ABSTRACT

A wiper blade for cleaning windows, especially of motor vehicles, is proposed, which has an elongated, rubber-elastic wiper strip (20) that can be pressed against the window (22) and is retained by a multi-member support bracket system (12) that has a main bracket (14), located in the middle portion of the support bracket system, is provided with a bolt (26), oriented transversely to the length of the wiper blade (10), for pivotable connection to a wiper arm (28) that is urged toward the window and is driven to swing, resulting in one wiper blade half near the swing axis and one wiper blade half remote from the swing axis, and the wiper blade is provided with spring means, which under tension, when the wiper blade is pressed against the window, additionally urge the half remote from the swing axis toward the window. A favorable embodiment and disposition of the spring means in terms of the masses to be moved is achieved by providing that the spring means are embodied as a leg spring (60), of which one leg (64) is braced directly or indirectly on the pivot bolt (26) and its other leg (66) is fixed to the half near the swing axis of the main bracket (14).

5 Claims, 2 Drawing Sheets

WIPER BLADE WITH SPRING BIAS

BACKGROUND OF THE INVENTION

The invention is based on a wiper blade. In a known wiper blade of this type, the spring means are formed by a tension spring, suspended by one end from the main bracket, with its other end retained on the outermost claw bracket, remote from the swing axis, that holds the wiper strip. The tension spring is positioned and designed such that particularly when sweeping over the vehicle windows that are most markedly curved spherically in the peripheral or corner regions, the end remote from the swing axis of the wiper strip is pulled outward toward the window, via the contact pressure originating in the wiper arm, and is thus additionally urged toward the window. The goal is that thereby, these regions of the windshield that count as problem zones can be properly cleaned as well. A disadvantage, however, is the relatively long and hence heavy tension spring, which considerably increases the weight of the wiper blade, which has to be braked at the turning points of the swing and then speeded up again out of them. Also in this connection, the disposition of the tension spring in the region of the wiper blade remote from the swing axis is a disadvantage.

SUMMARY OF THE INVENTION

In the wiper blade of the invention, the leg spring is extremely compact and comparatively light in weight, so that the loads acting on the drive system of the wiper system during wiper operation are reduced markedly. Its disposition in the region of the pivot bolt contributes to this as well, because it shifts the center of gravity of the wiper blade toward the swing axis.

If the main bracket has two cheeks spaced apart from one another, on which the ends of the pivot bolt are retained, and a connection adapter adapted to the free end of the wiper arm is supported in a way capable of swinging between the cheeks on the pivot bolt, with one leg plunging into a recess in the adapter and the other leg being fixed to one of the two cheeks, then the leg spring is essentially positioned in a space existing between the cheeks, defined by the wiper arm engaging the adapter, and hence is practically invisible.

An operationally reliable bracing of the prestressed leg spring is assured if the body of the leg spring is located in a throat of the connection adapter that extends parallel to the pivot bolt between the two cheeks.

Expediently, the other leg of the leg spring engages one cheek from beneath with an extension, so that given a suitably prestressed leg spring, the wiper blade half remote from the swing axis is urged toward the window.

Reliable securing of the leg spring in its operating position is achieved by fixing the extension of the other spring leg in a recess of the cheek of the main bracket.

Further advantageous refinements and features of the invention are recited in the ensuing description of an exemplary embodiment shown in the associated drawing.

BRIEF DECSRIPTION OF THE DRAWINGS

Figure 1:
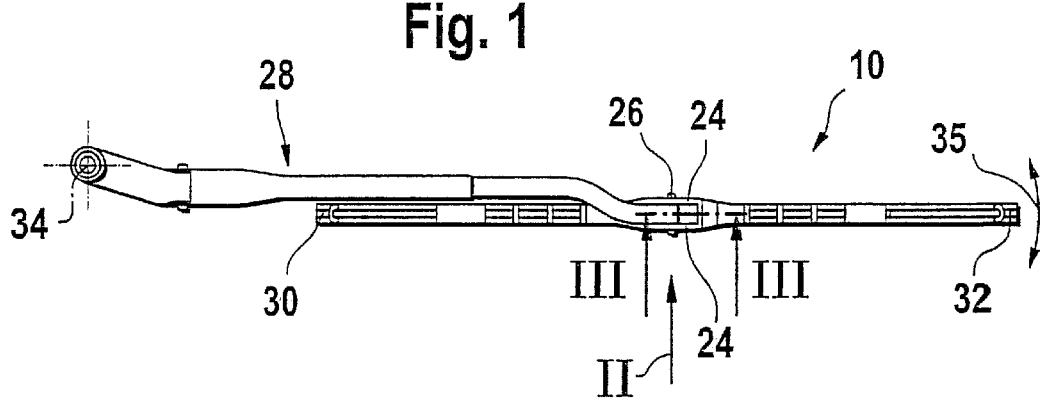
Figure 2:
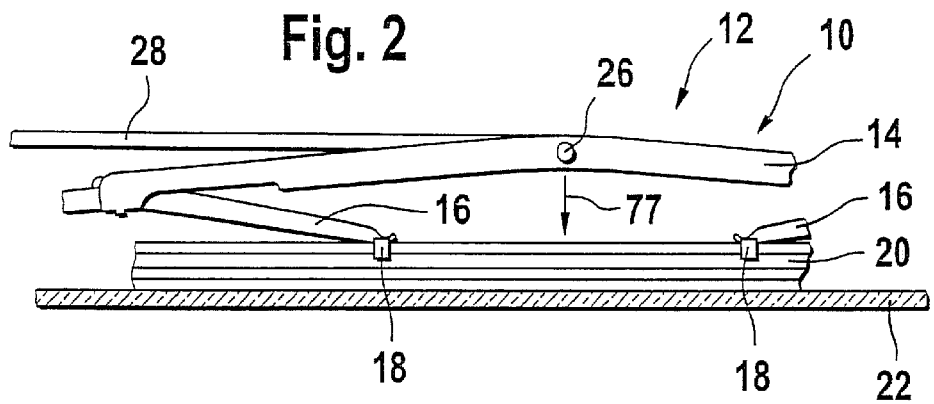
Figure 3:
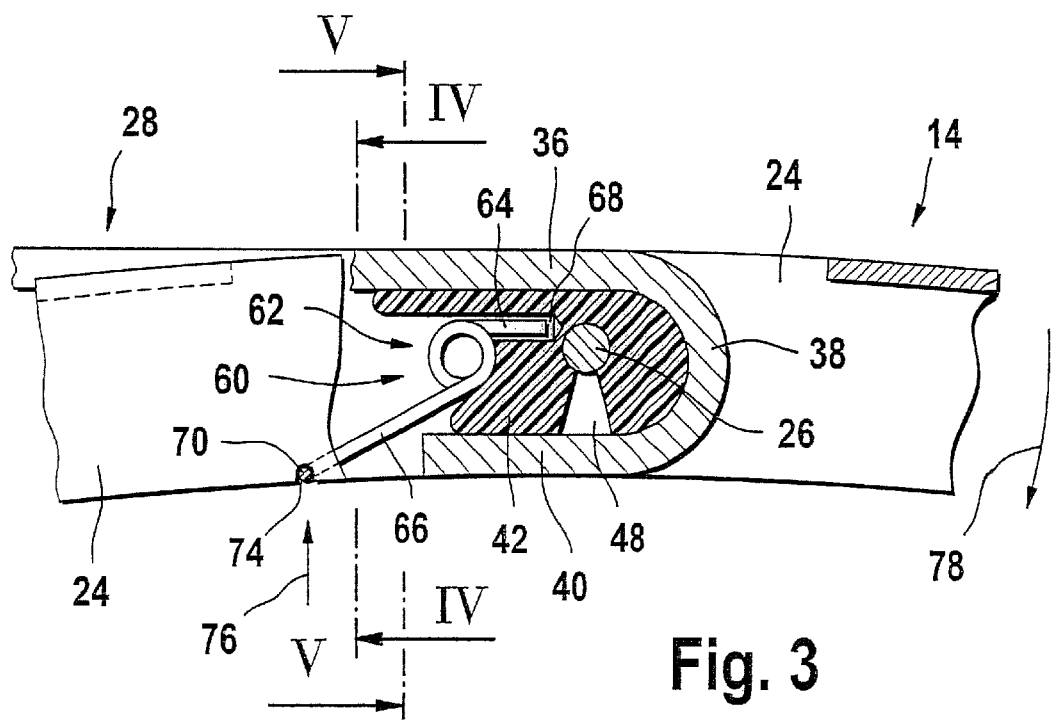
Figure 4:
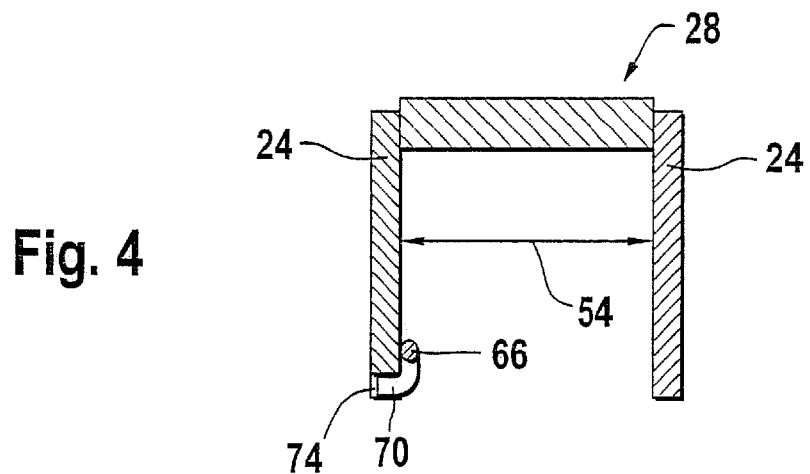
Figure 5:
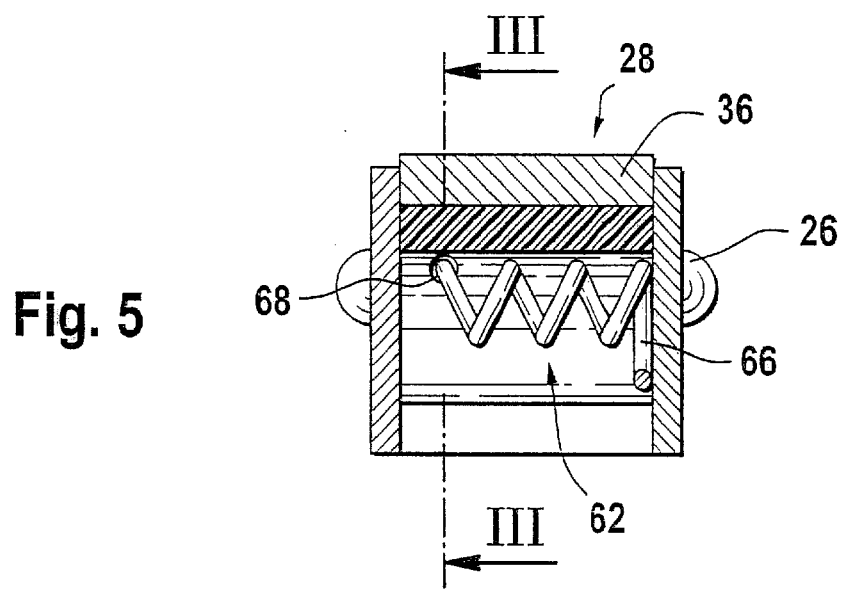
Figure 6:
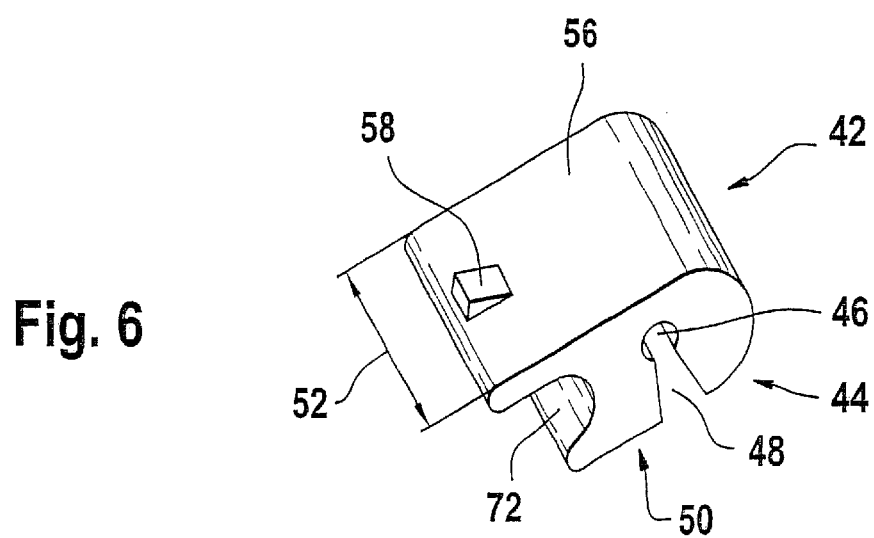

Shown in the drawing are: FIG. 1, a plan view on a wiper blade of the invention with the associated wiper arm; FIG. 2, an enlarged fragmentary side view of the wiper blade of FIG. 1 in the direction of the arrow II; FIG. 3, a fragmentary section through the main bracket of the wiper blade along the line III—III of FIG. 1, in an enlarged view whose location can be seen from FIG. 5; FIG. 4, the section faces of a cross section through the main bracket of FIG. 3 taken along the line IV—IV, with the end of the other leg of a leg spring drawn in; FIG. 5, the section face of a cross section through the main bracket of FIG. 3 taken along the line V—V, with the location, represented by the line III—III, of the section III—III of FIG. 3; and FIG. 6, a perspective view, not to scale, of a connection adapter, belonging to the wiper blade, for connecting the wiper blade to the wiper arm.

DESCRIPTION OF THE PREFERRED EMBODIMENT

A wiper blade 10 shown in FIGS. 1 and 2 has a support bracket system 12, known per se, which is constructed from a plurality of support brackets connected pivotably connected to one another. Hence it has a primary main bracket 14, to whose ends secondary claw brackets 16 are pivotably connected. The main bracket 14 is thus located in the middle portion of the support bracket system. The claw brackets 16, with claws 18, engage an elongated, rubber-elastic wiper strip 20, which is pressed with its wiper lip against the surface of a windshield 22 of a motor vehicle that is to be wiped. The main bracket 14 has two spaced-apart lateral cheeks 24, on each of which one end of a pivot bolt 26 is retained. The pivot bolt is disposed in the middle portion of the main bracket 14 and extends transversely to the length of the wiper blade 10, that is, of the main bracket. The pivot bolt 26 serves the purpose of pivotable connection of the wiper blade 10 to a wiper arm 28 that is urged toward the window 22 and is driven to swing about a swing axis 34 in the direction of the double arrow 35. The swing axis is located on the end of the wiper arm that is remote from the wiper blade, that is, from the pivot bolt 26. Arrangements of this kind are well known to one skilled in the art, for instance from Published, Nonexamined German Patent Application DE-OS 15 05 257. As FIG. 1 shows, the wiper blade 10 pivotably connected to the wiper arm 28 thus has one end 30 near the swing axis and one end 32 remote from the swing axis.

As can be seen from FIG. 3, the free end, remote from the swing axis 34, of the wiper arm 28 is curved in hooklike fashion (FIG. 2). It thus changes over to a first hook leg 36, which is adjoined by a curved portion 38, which in turn merges with a second hook leg 40. These wiper arm hooks 36, 38, 40 form the wiper arm part of a connecting device with the aid of which the wiper blade 10 can be pivotably connected to the wiper arm 28. The wiper blade part of this connecting device includes the aforementioned pivot bolt 26, onto which a connection adapter 42 is snapped. The adapter 42, made from an elastic plastic, is shown in perspective in FIG. 6. It has a blocklike body 44, with a bearing bore 46 that is adapted to the diameter of the pivot bolt 26. The bearing bore itself is open at the edge, toward the underside 50 of the body 44, via an introduction channel 48. The width 42 of the adapter is adapted to the spacing 54 (FIG. 4) between the two cheeks 24 of the main bracket 14 in such a way that it can be positioned between these cheeks as much as possible without play. To that end, the adapter 42 is placed with its introduction channel 48 on the pivot bolt 26 and snapped into the bearing bore, in the course of which the introduction channel 48 converging toward the bearing bore 46 is widened elastically. The adaptation between the diameter of the pivot bolt 26 and the bearing bore 46 is made such that the connection adapter 42 can swing as much as possible without play about the longitudinal axis of the pivot bolt. On its top 56, the plastic adapter 42 is provided with a detent tooth 58 (FIG. 6), which snaps into an associated recess of the wiper arm when the wiper blade 10 is pivotably connected, in the manner shown in FIG. 3, to the wiper arm 28. In the process, the two hook legs 36 and 40 rest on the top 56 and underside 50, respectively, of the adapter, and the hook leg 36 thus prevents opening of the introduction channel 48 and hence unintended detachment of the wiper blade 10 from the wiper arm 28. The detent tooth 58, in cooperation with the recess associated with it in the wiper arm 28, prevents a relative displacement between the wiper arm 28 and the wiper blade 10. From FIGS. 3 and 5, it can be seen that a leg spring 60 is disposed on the side of the adapter 42 toward the swing axis 34. This leg spring has a spring body 62 in the manner of a helical compression spring, which has a plurality of windings. Each terminal winding merges with a respective spring leg 64 and 66, which each extend essentially at a tangent from a terminal winding away from the spring body 62. By means of a targeted tensing motion of the spring legs 64, 66, in the course of which at least one of the two legs is pivoted about the longitudinal axis of the spring body 62, this leg spring, which can also be called a torsion spring, can be prestressed. Under this prestressing, the one, relatively short spring leg 64 is introduced into a bore 68 in the adapter 42, while the other, longer spring leg 66, with an extension 70 (FIG. 4) disposed on its free end, engages one cheek 24 of the main bracket 14 from beneath. What is essential here is that the extension 70 engages a shoulder of the cheek 24 that is oriented toward the window 22 from beneath. This shoulder could also be formed by part of the wall of a bore disposed in the cheek, which bore is engaged on the inside by the spring leg 66 with its extension 70. The engagement point of the spring leg 66 or of the extension 70 on the cheek 24 is located—in terms of the pivot bolt 26, on the side of the main bracket 14 toward the end 30 of the wiper blade that is near the swing axis. For secure bracing of the leg spring on the connection adapter 42, the spring body 62 is braced over its entire length in a throat 72 of the adapter, which throat extends parallel to the pivot bolt 26, that is, parallel to the bearing bore 46, over the full width 52 of the adapter between the cheeks 24. To achieve a fixation of the leg spring 60 in its operating position, shown in FIG. 3, the extension 70 of the spring leg 66 rests in a recess 74, open at the edge, on the underside of the cheek 24. The prestressing of the leg spring is selected such that the spring leg 66, with its extension 70, urges the main bracket 14 in the direction of the arrow 76 (FIG. 3), so that the wiper blade 10 seeks to rotate about the pivot axis of the bearing bolt 26 in the direction of the arrow 78. It is clear that in the process, beyond the contact pressure (arrow 77) originating in the wiper arm 28, the half of the wiper blade remote from the swing axis, and in particular the end 32 remote from the swing axis, is subjected to a stronger contact pressure against the window 22 than the half near the swing axis or the end 30 near the swing axis of the wiper blade 10.

The wiper blade 10 of the invention is accordingly provided with spring means which are embodied as a leg spring 60. One spring leg 60 is thus braced indirectly—since it dips into the recess 68—via the adapter on the pivot bolt 26, while the other leg 66 is fixed to the half of the main bracket 14 near the swing axis.

It is thus possible in a simple way—for instance by varying the prestressing of the leg spring—to adapt the additional loading of the wiper blade half remote from the swing axis to the applicable requirements, which depend on the type of vehicle involved.

What is claimed is:

1. A wiper blade (10) for cleaning windows (22), especially of motor vehicles, having an elongated, rubber-elastic wiper strip (20), which can be pressed against the window and which is held by a multi-member support bracket system (12) that has a main bracket (14), and the main bracket, located in the middle portion of the support bracket system, is provided with a bolt (26), oriented transversely to the length of the wiper blade, for pivotable connection to a wiper arm (28) that is driven to swing and is urged toward the window, resulting in one wiper blade half near the swing axis and one wiper blade half remote from the swing axis, and the wiper blade is provided with spring means, which when under tension, with the wiper blade pressed against the window, additionally urge its half remote from the swing axis toward the window, characterized in that the spring means are embodied as a leg spring (60), one leg (64) of which is braced directly or indirectly on the pivot bolt (26) and the other leg (66) of which is fixed to the half of the main bracket (14) near the swing axis.

2. The wiper blade of claim 1, characterized in that the main bracket (14) has two spaced-apart cheeks (24), on which the ends of the pivot bolt (26) are retained, and between the cheeks on the pivot bolt, a connection adapter adapted to the free end of the wiper arm (28) is supported in a way capable of swinging, with said one leg (64) plunging into a recess (68) in the adapter (42) and the other leg (66) being fixed to one of the two cheeks (24).

3. The wiper blade of claim 2, characterized in that a body (62) of the leg spring (60) rests in a throat (72) of the connection adapter (42), which throat extends parallel to the pivot bolt (26) between the two cheeks (24).

4. The wiper blade of claim 2, characterized in that the other leg (66) of the leg spring (60) engages one of the cheeks (24) from beneath with an extension (70).

5. The wiper blade of claim 4, characterized in that the extension (70) of the other spring leg (66) is fixed in a recess (74) of said one of the cheeks (24).

* * * * *